Feb. 12, 1957
H. LEVINE
2,781,467
HOUSEHOLD MIXER CHASSIS
Filed April 16, 1956
2 Sheets-Sheet 1
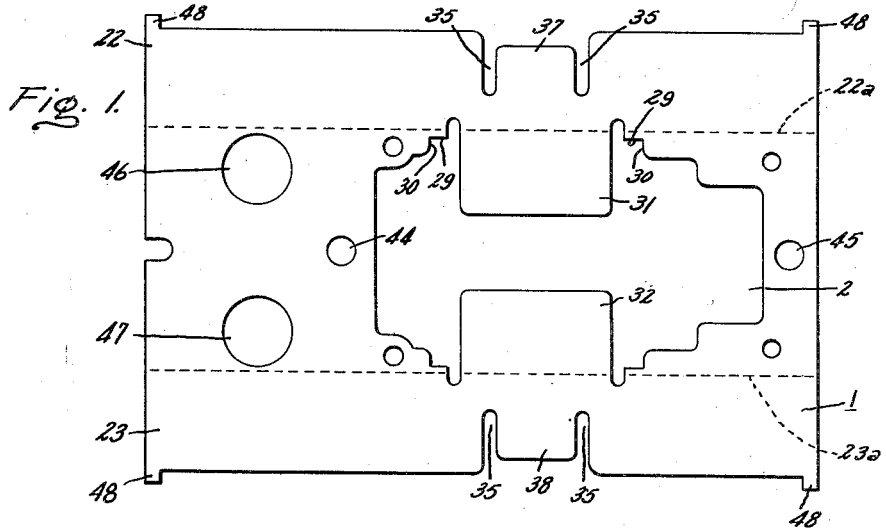
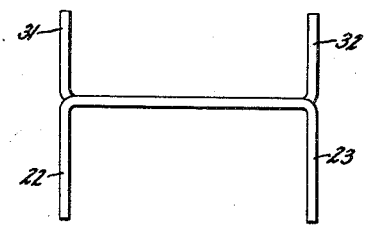
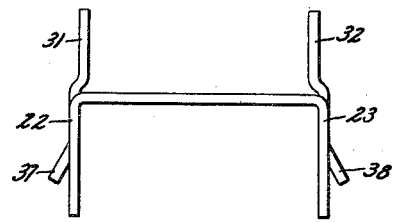
Inventor:
Harvey Levine,
by Lawrence R. Kempton
His Attorney.

Feb. 12, 1957  H. LEVINE  2,781,467
HOUSEHOLD MIXER CHASSIS
Filed April 16, 1956  2 Sheets-Sheet 2
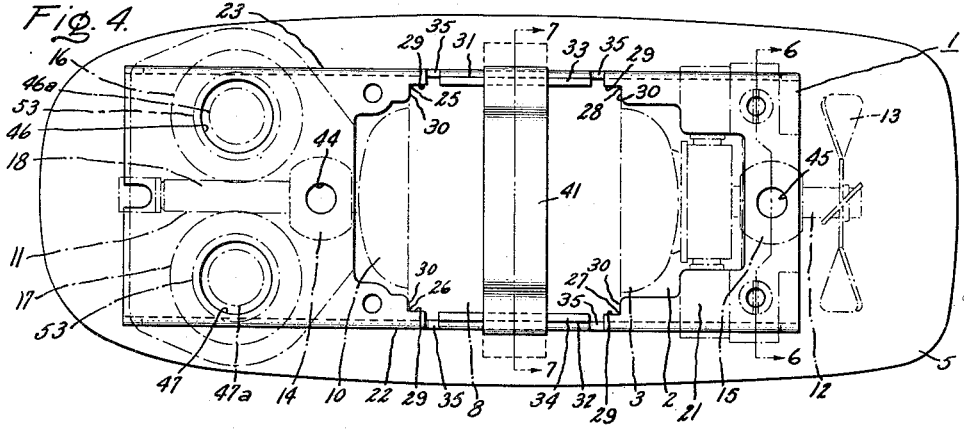
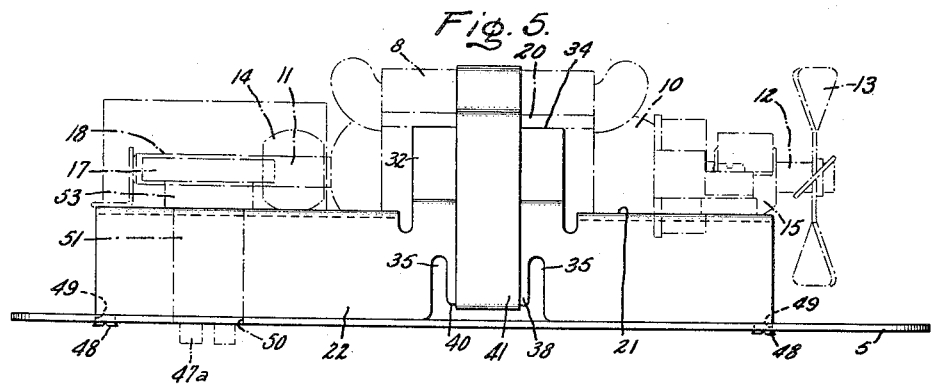
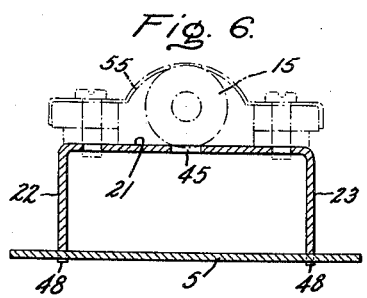
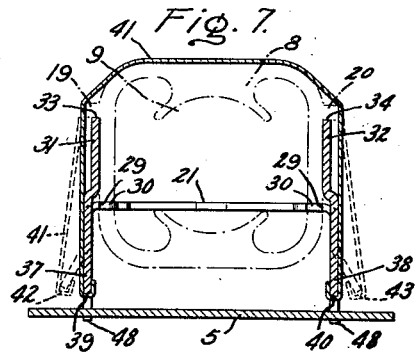
Inventor:
Harvey Levine,
by Lawrence R. Kempton
His Attorney.

United States Patent Office 2,781,467
Patented Feb. 12, 1957

2,781,467
HOUSEHOLD MIXER CHASSIS

Harvey Levine, Fairfield, Conn., assignor to General Electric Company, a corporation of New York Application April 16, 1956, Serial No. 578,319

8 Claims. (Cl. 310—254)

This invention relates to household mixing devices and more particularly to a support for mounting the mixer motor and the beater shafts of a household food mixer.

One object of this invention is to provide an improved support for a household mixer which is rugged in construction and which accurately supports the mixer motor and the beater shafts of the household mixer.

Another object of this invention is to provide a novel support for a household mixer which enhances cooling of the mixer.

It is a still further object of this invention to reduce the cost of household mixers without sacrificing quality.

In accordance with one aspect of this invention, a stamped chassis is provided for supporting the mixer motor and the mixer beater shafts. The chassis has a horizontal table portion and two downwardly bent side portions substantially parallel to each other, thus enabling cooling air to flow above the horizontal table portion and below the horizontal table portion between the two downwardly bent side portions. An enlarged opening is stamped in the horizontal table portion of the chassis for accurately receiving and supporting a laminated motor field structure. Two relatively large holes are also stamped in the horizontal table portion of the chassis for accurately supporting the sleeve bearings of the mixer beater drive shafts.

Other objects and attendant advantages of this invention will be apparent from the following description taken in connection with the accompanying drawings in which:

Fig. 1 is a plan view of a flat plate showing the shape in which it is stamped out for producing my improved mixer motor chassis;

Fig. 2 is an end elevational view of the plate showing portions thereof displaced by a forming operation;

Fig. 3 is an end elevational view of the plate after an additional forming operation;

Fig. 4 is a top plan view of my improved mixer supporting means;

Fig. 5 is a side elevational view of my improved mixer supporting means;

Fig. 6 is a cross section taken on the line 6—6 of Fig. 4 showing my armature shaft bearing supporting means; and Fig. 7 is a cross sectional view taken on line 7—7 of Fig. 1 illustrating a method of fixing my motor field structure to the supporting means.

My novel mixer support is formed solely of stampings which may be produced upon any suitable form of press adapted to cut and form sheet material, as for example, sheet metal, wood fibre, plastic, hard rubber and the like.

Referring now to Fig. 1, there is illustrated a piece of sheet metal 1 which is accurately stamped as shown. During the stamping operation, a central recess 2 is cut for receiving a motor field structure, holes 46 and 47 for supporting mixer beater shaft bearings are accurately cut and positioned with respect to central opening 2, and holes 44 and 45 for locating a motor armature shaft are accurately cut and positioned with respect to holes 46 and 47 as well as enlarged opening 2. As shown in Fig. 1, other components are also accurately formed in sheet 1 and will be more fully described hereinafter.

After the sheet 1 is cut as shown in Fig. 1, a forming operation is performed thereon. A control point or points may be chosen for this operation in order to accurately fix the position of blanked sheet 1 while it is being formed into a chassis. Sheet 1 is bent along dotted lines 22a and 23a to form downwardly extending side portions 22 and 23. During this operation, inwardly directed tongues 31 and 32 remain in the planes of sides 22 and 23, respectively, so as to form upward extensions of side portions 22 and 23, respectively.

After sheet 1 is cut and formed as just described, an additional forming operation is performed on plate 1. As shown in Fig. 3, downwardly extending tongues 37 and 38 are bent outwardly away from the support, while upwardly directed tongues 31 and 32 are pushed inwardly toward the center of the support for a purpose to be more fully described hereinafter.

Because the basic principles of my invention as well as the ingenuity involved in cutting and forming a single piece of material to support accurately a mixer will be more easily understood by reference to the apparatus to be supported, the mixer motor and beater drive shaft arrangement will now be described. Referring to Figs. 4 and 5 of the drawing, there is illustrated in dotted lines a motor 3 which may be supported on my improved stamped chassis 1. Motor 3 is provided for driving mixer beater drive shafts 46a and 47a. In the arrangement illustrated, motor 3 includes a laminated field structure 8. As shown in Fig. 7, field structure 8 has an opening 9 therein for the reception of motor armature 10. Turning to Fig. 5, it can be seen that motor armature 10 is provided with two armature shaft end portions 11 and 12 which extend in opposite directions beyond field structure 8. A fan 13 is mounted on end portion 12 of the armature shaft for cooling the motor. As shown in Fig. 4, a ball-shaped bearing 14 surrounds end portion 11 of the armature shaft and a ball-shaped bearing 15 surrounds end portion 12 of the armature shaft. End portion 11 of the armature shaft extends between gears 16 and 17 and has a worm gear 18 formed thereon for driving gears 16 and 17. As shown in Fig. 4, beater drive shafts 46a and 47a are fixed to gears 16 and 17, respectively. Thus rotation of worm 18 causes rotation of shafts 46a and 47a.

My improved chassis which is formed from a single piece of material will now be more particularly described. In the arrangement illustrated, the chassis comprises a flat, horizontal table portion 21 and two downwardly bent side portions 22 and 23. The side portions 22 and 23 are substantially parallel to each other. As shown in Figs. 1 and 4 enlarged opening 2 is stamped in the table portion of the chassis for supporting motor field structure 8. This opening has four corners 25, 26, 27 and 28. Each of these corners has a generally longitudinally extending shoulder 29 for limiting transverse motion of the motor field structure 8 and a generally transverse shoulder 30 for limiting longitudinal motion of motor field structure 8. It should be appreciated that a substantial portion of the opening for receiving motor field structure 8 is formed when tabs 31 and 32 are moved upwardly perpendicular to the plane of horizontal table portion 21. Each of the vertical tabs 31 and 32 has upper edges 33 and 34, respectively, for abutting projections 19 and 20, respectively, formed on the laminated field structure. Further, in order to provide additional rigidness for the field structure, the inside surfaces of tabs 31 and 32 are arranged for abutting the sides of field structure 8. Thus, metal which might be wasted in cutting an opening for field structure 8 is effectively utilized for accurately and rigidly supporting the field structure.

I also provide means for securely holding motor field structure 8 to my improved sheet metal support. In the arrangement illustrated in Fig. 7 it can be seen that a pair of parallel slots 35 are stamped in each of side portions 22 and 23 of motor chassis 1. Two downwardly extending tongues 37 and 38 having tips 39 and 40, respectively, are formed by slots 35. As shown in Fig. 7, a field strap 41 is provided with hook portions 42. Hook portions 42 are fitted around tips 39 and 40 of tongues 37 and 38 for holding the field structure to the sheet metal support. The exact mode of assembly is more fully described hereinafter.

As shown in the various views of the drawing, my improved sheet metal chassis which is made from a single sheet of material is also provided with other components integrally formed therewith. Motor chassis 1 is formed with a plurality of small tabs 48 extending downwardly from side portions 22 and 23 for connecting chassis 1 to a base plate 5.

Base plate 5 is provided for supporting motor chassis 1 and for closing the opening in the mixer cover (not shown). In the arrangement illustrated, a plurality of holes 49 are stamped in base plate 5 for receiving small tabs 48 formed on side portions 22, 23 of motor chassis 1. Two relatively large, transversely arranged holes 50 are also formed in base plate 5 for supporting the beater shaft bearings. One of the holes 50 is coaxial with hole 46 and the other hole 50 is coaxial with hole 47 formed in the horizontal table portion of chassis 1.

Assembly

In assembling the mixer, sheet metal chassis 1 is placed over base plate 5 with small tabs 48 extending through openings 49 formed in the base plate. Small tabs 48 are then staked or overturned as shown in Fig. 5, thereby to fix rigidly motor chassis 1 to base plate 5. Two sleeve bearings 51 each having a collar 53 are positioned in holes 46 and 47 and extend downwardly into holes 50 formed in base plate 5 so that collars 53 abut the horizontal table portion of chassis 1, thereby rigidly fixing the spindle bearings to the motor chassis and to the base plate 5. Mixer beater drive shafts 46a and 47a are inserted within spindle bearings 51 and rotate freely therein. Thus, stamped holes 46, 47 and 50 accurately position beater drive shafts 46a and 47a.

Laminated field structure 8 is pushed into enlarged recess 2 so that the ends thereof are longitudinally restricted by shoulders 30, the sides thereof are transversely restricted by shoulders 29, and downward movement thereof is restricted by upper edges 33 and 34 of vertical tabs 31 and 32. Field strap 41 is placed over field structure 8 and hooks 42 and 43 formed thereon engage tips 39 and 40 of tongues 37 and 38, respectively. Then tongues 37 and 38 are forced inwardly from the dotted line position shown in Fig. 7 to the solid line position shown in Fig. 7. As tongues 37 and 38 move inwardly, the lower tip portions 39 and 40 thereof necessarily move downwardly thereby exerting a tightening effect on the field strap 41. Thus, field structure 8 is held firmly in place. Ball-shaped armature shaft bearings 14 and 15 are placed in longitudinally arranged holes 44 and 45, respectively, thereby to align accurately armature 10 within field structure 8. As shown in Fig. 6, ball-shaped bearings 14 and 15 are pushed downwardly and held firmly in place by straps 55 or other suitable securing means.

Operation

In operation, armature 10 rotates within field structure 8. End portions 11 and 12 of the armature shaft rotate freely within sleeve bearings 14 and 15, respectively. Worm gear 18 formed on end portion 11 of the armature shaft rotates gears 16 and 17 in opposite directions thereby causing contrarotation of mixer beater shafts 46a and 47a. Fan 13 is rigidly fixed to end portion 12 of the armature shaft and forces cooling air through the motor. This cooling air may pass freely through the space between base plate 5 and table portion 21, as well as over the top table portion 21 and around the motor. In this manner, superior motor cooling is achieved.

While there has been shown and described above a particular embodiment of this invention, it will be obvious to those skilled in the art that numerous changes and modifications may be made therein without departing from the invention, and it is, therefore, aimed in the appended claims to cover all such changes and modifications as fall within the true spirit and scope of the invention.

What I claim as new and desire to secure by Letters Patent of the United States is:

1. In a food mixer comprising a laminated stationary mixer motor field structure, an opening formed in said stationary mixer motor field structure, an armature disposed in said opening, said armature having a shaft provided with two end portions extending in opposite directions beyond said field structure, two parallel spaced beater drive shafts, a gear fixed to each of said beater drive shafts, a worm gear formed on one end portion of said armature shaft meshing with each of said gears fixed to said beater drive shafts, the improvement comprising a stamped sheet chassis, said stamped chassis having a horizontal table portion and two downwardly bent side portions substantially parallel to the axis of said armature shaft, an enlarged stamped opening formed in said horizontal table portion for receiving said field structure, and two relatively large transversely arranged stamped holes formed in said horizontal table portion for accurately positioning said beater drive shafts.

2. In a food mixer comprising a laminated stationary mixer motor field structure, an opening formed in said mixer motor field, an armature disposed in said opening, said armature having a shaft provided with two end portions extending in opposite directions beyond said field structure, two parallel spaced beater drive shafts, a gear fixed to each of said beater drive shafts, a worm gear formed on one end portion of said armature shaft meshing with each of the gears fixed to said beater drive shafts, the improvement comprising a stamped sheet chassis, said stamped chassis having a horizontal table portion and two downwardly bent side portions substantially parallel to the axis of said armature shaft, an enlarged stamped opening formed in said horizontal table portion, said enlarged opening having four corners, each of said corners including a transversely extending shoulder and a longitudinally extending shoulder substantially perpendicular to said transverse shoulder whereby said transverse shoulder accurately longitudinally locates said field structure and said longitudinal shoulder accurately transversely locates said field structure, and two relatively large, transversely arranged stamped holes formed in said horizontal table portion for accurately positioning said beater drive shafts.

3. In a food mixer comprising a laminated stationary mixer motor field structure, an opening formed in said mixer motor field structure, an armature disposed in said opening, said armature having a shaft provided with two end portions extending in opposite directions beyond said field structure, ball-shaped sleeve bearings surrounding each of said two end portions of said shaft, two parallel spaced beater drive shafts, a gear fixed to each of said beater drive shafts, a worm gear formed on one end portion of said armature shaft meshing with each of the gears fixed to said beater drive shafts, the improvement comprising a stamped sheet chassis, said stamped sheet metal motor chassis having a horizontal table portion and two downwardly bent side portions substantially parallel to the axis of said armature shaft, an enlarged stamped opening formed in said horizontal table portion for receiving said field structure, two longitudinally arranged stamped holes formed in said horizontal table portion located at opposite ends of said stamped opening, each of said ball-shaped bearings being seated in one of the respective longitudinally arranged stamped holes whereby to accurately locate the armature on said chassis, and two relatively large transversely arranged stamped holes formed in said horizontal table portion for accurately positioning said beater shafts.

4. In a food mixer comprising a laminated stationary mixer motor field structure having projections formed on opposite sides thereof, an opening formed in said mixer motor field structure, an armature disposed in said opening said armature having a shaft provided with two end portions extending in opposite directions beyond said field structure, ball-shaped sleeve bearings surrounding each of said two end portions of said shafts, two parallel spaced beater drive shafts, a gear fixed to each of said beater drive shafts, a worm gear formed on one end portion of said armature shaft meshing with each of the gears fixed to said beater drive shafts, the improvement comprising a stamped sheet metal motor chassis formed from a single piece of sheet metal, said stamped chassis having a horizontal table portion and two downwardly bent side portions substantially parallel to the axis of said armature shaft, an enlarged stamped opening formed in said horizontal table portion for receiving said field structure, and two upwardly extending substantially vertical tabs on opposite sides of said chassis, each of said tabs forming a continuation of said side portions extending upwardly from said table portion and each of said tabs having an uppermost edge for abutting the respective projections formed on opposite sides of said field structure thereby to support said field structure.

5. In a food mixer comprising a laminated stationary mixer motor field structure having projections formed on opposite sides thereof, an opening formed in said mixer motor field structure, an armature disposed in said opening, said armature having a shaft provided with two end portions extending in opposite directions beyond said field structure, ball-shaped sleeve bearings surrounding each of said two end portions of said shafts, two parallel spaced beater drive shafts, a gear fixed to each of said beater drive shafts, a worm gear formed on one end portion of said armature shaft meshing with each of the gears fixed to said beater drive shafts, the improvement comprising a stamped sheet chassis, said stamped chassis having a horizontal table portion and two downwardly bent side portions substantially parallel to the axis of said armature shaft, an enlarged stamped opening formed in said horizontal table portion for receiving said field structure, two upwardly projecting substantially vertical tabs on opposite sides of said chassis, each of said tabs forming a continuation of said side portions extending upwardly from said table portion, each of said tabs having an uppermost edge for abutting the respective projections formed on opposite sides of said field structure thereby to support said field structure, each of said side portions having two parallel slots stamped therein thereby to form two downwardly projecting side tongues each having a tip, each of said tongues being bent outwardly away from said side portions, and a strap having hook portions formed on opposite ends thereof, said strap being placed over said field structure, each of said hook portions being fitted around the tips of said tongues whereby inward movement of said tongues causes said strap to effectively hold said field structure to said chassis.

6. In a food mixer comprising a laminated stationary mixer motor field structure having projections formed on opposite sides thereof, an opening in said field structure, an armature disposed in said opening, said armature having a shaft provided with two end portions extending in opposite directions beyond said field structure, ball-shaped sleeve bearings surrounding each of said two end portions of said shaft, two parallel spaced beater drive shafts, a gear fixed to each of said beater drive shafts, and a worm gear formed on one end portion of said armature shaft meshing with each of the gears fixed to said beater drive shafts, the improvement comprising a stamped sheet chassis, said stamped chassis having a horizontal table portion and two downwardly bent side portions substantially parallel to the axis of said armature shaft, an enlarged stamped opening formed in said horizontal table portion for receiving said field structure, two upwardly projecting substantially vertical tabs on opposite sides of said chassis, each of said tabs forming a continuation of said side portions extending upwardly from said table portion, each of said upwardly extending tabs having an uppermost edge for abutting the respective projections formed on opposite sides of said field structure thereby to support said field structure, each of said side portions also having two parallel slots stamped therein thereby to form two downwardly projecting tongues each having a tip, each of said tongues being bent outwardly away from said side portions, a strap having hook portions formed on opposite ends thereof, said strap being placed over said field structure, each of said hook portions being fitted around the tips of said tongues whereby inward movement of said tongues causes said strap to effectively press said field structure against said tabs, thereby effectively holding said field structure to said chassis, two longitudinally arranged stamped holes formed in said horizontal table portion, said stamped holes being located at opposite ends of said enlarged stamped opening, each of said ball-shaped bearings being seated in one of the respective longitudinally arranged stamped holes thereby to locate accurately the armature on said chassis, a plurality of relatively small stamped tabs extending downwardly from each of said vertical side portions, a generally rectangular flat base plate, a plurality of relatively small holes stamped in said base plate, each of said relatively small tabs extending through a respective relatively small hole in said base plate, said tabs being staked whereby to fix rigidly said mixer motor chassis to said base plate, two relatively large, transversely arranged stamped holes formed in said horizontal table portion, two relatively large holes stamped in said base plate, each of said relatively large holes formed in said base plate being concentric with a respective transversely arranged hole formed in said horizontal table portion, and two sleeve bearings for said beater drive shafts positioned and accurately supported in said relatively large holes formed in said base plate and in said motor chassis.

7. A sheet metal support for household mixers comprising a stamped sheet metal chassis having a horizontal table portion and two downwardly bent side portions substantially parallel to each other, an enlarged stamped opening formed in said horizontal table portion, two upwardly projecting substantially vertical tabs on opposite sides of said chassis, each of said tabs forming a continuation of said side portions extending upwardly from said table portion, each of said side portions having two downwardly extending centrally located tongues, two longitudinally arranged stamped holes formed in said horizontal table portion located at opposite ends of said enlarged stamped opening, and two relatively large transversely arranged stamped holes formed in said horizontal table portion.

8. A sheet metal support for household mixers comprising a horizontal table portion and two downwardly bent side portions substantially parallel to each other, an enlarged stamped opening formed in said horizontal table portion, said enlarged opening having four corners, each of said corners including a transversely extending shoulder and a longitudinally extending shoulder substantially perpendicular to said transverse shoulder, two upwardly projecting substantially vertical tabs on opposite sides of said chassis, each of said tabs forming a continuation of said side portions extending upwardly from said table portion, each of said side portions having parallel slots stamped therein thereby to form two downwardly projecting side tongues each having a tip, two longitudinally arranged stamped holes formed in said horizontal table portion located at opposite sides of said enlarged stamped opening, and two relatively large transversely arranged stamped holes formed in said horizontal table portions.

No references cited.